United States Patent
Orcutt

(10) Patent No.: US 8,433,863 B1
(45) Date of Patent: Apr. 30, 2013

(54) HYBRID METHOD FOR INCREMENTAL BACKUP OF STRUCTURED AND UNSTRUCTURED FILES

(75) Inventor: Stanford Niel Orcutt, Pleasant Grove, UT (US)

(73) Assignee: Symantec Operating Corporation, Mountain View, CA (US)

( * ) Notice: Subject to any disclaimer, the term of this patent is extended or adjusted under 35 U.S.C. 154(b) by 968 days.

(21) Appl. No.: 12/057,178

(22) Filed: Mar. 27, 2008

(51) Int. Cl.
*G06F 12/00* (2006.01)

(52) U.S. Cl.
USPC .... 711/162; 711/156; 711/170; 711/E12.103; 711/E12.002; 707/647; 707/646; 707/E17.128; 707/E17.061

(58) Field of Classification Search .................. 711/163, 711/164, 162, E12.002, 170, E12.103, 156; 707/645, 646, 647, E17.061, E17.128
See application file for complete search history.

(56) References Cited

U.S. PATENT DOCUMENTS

| | | | | |
|---|---|---|---|---|
| 5,737,763 A | * | 4/1998 | Hilditch | 711/162 |
| 6,629,110 B2 | * | 9/2003 | Cane et al. | 707/999.001 |
| 7,251,749 B1 | * | 7/2007 | Fong et al. | 714/20 |
| 7,506,010 B2 | * | 3/2009 | Kulkarni et al. | 1/1 |
| 7,809,691 B1 | * | 10/2010 | Karmarkar et al. | 707/674 |
| 8,176,338 B1 | * | 5/2012 | Stringham | 711/163 |
| 8,326,803 B1 | * | 12/2012 | Stringham | 707/652 |
| 2006/0218435 A1 | * | 9/2006 | van Ingen et al. | 714/6 |
| 2007/0226436 A1 | * | 9/2007 | Cheng et al. | 711/162 |
| 2007/0250671 A1 | * | 10/2007 | Lyon | 711/162 |

* cited by examiner

*Primary Examiner* — Pierre-Michel Bataille
(74) *Attorney, Agent, or Firm* — Robert C. Kowert; Meyertons, Hood, Kivlin, Kowert & Goetzel, P.C.

(57) ABSTRACT

An incremental backup service may be configured to backup structured files and unstructured files on a client system. A filter driver 130 may be configured to monitor write operations on the client system and log changed cluster address information for structured files. The backup service may backup changed clusters of structured files to a backup storage device. For each of the unstructured files, the backup service may compare the file size to a threshold size. If the unstructured file is smaller than the threshold size, the backup service may backup the entire unstructured file. If the file size is larger than the threshold size, the backup service may determine the ratio of changed clusters to unchanged clusters. If the ratio is below a ratio threshold, the backup service may backup the changed clusters. If the ratio is above the ratio threshold, the backup service may backup the entire file.

20 Claims, 8 Drawing Sheets

Change Log 250

| File Name | Cluster Address | Date/Time Of Last Change |
|---|---|---|
| C:\Program Files\Foo.dat | 150 | Jan. 1, 2008 12:00:38 |
| C:\Program Files\Bogus.email | 275 | Jan 5, 2008, 20:00:45 |

FIG. 4

HYBRID METHOD FOR INCREMENTAL BACKUP OF STRUCTURED AND UNSTRUCTURED FILES

BACKGROUND

In present computing environments, "Backup" refers to making a copy of data such that the copy may be used to restore the original data after a data loss event. The copy is typically stored on media separate than the primary storage device. Backups are useful for two reasons. The first is to restore a data state following a disaster. The second is to restore small numbers of files after they have been accidentally deleted or corrupted.

A full backup plus incremental backup stores several copies of the data. The first backup is a full backup, meaning all data on the primary storage device is copied to a separate backup storage device. After that, incremental backups are made, where only the files that have changed since the previous full or previous incremental backup was made. Restoring the whole system requires restoring the full backup and all the incremental backups. Incremental backups save time and space because files that have not changed are not unnecessarily backed up.

Remote or online backups may provide for backing up data over a network. Typically, a client software program runs on a schedule (e.g., once a day) and collects, compresses and transfers the data to a remote backup server over a network (e.g., the Internet). Regularly scheduled remote backups of large amounts of data (e.g., large database files) may impact network throughput. Generally speaking, backing up and restoring data in a fast, reliable fashion may be very complex.

SUMMARY

Various embodiments of methods and systems for the incremental backup of structured and unstructured files are disclosed. An incremental backup service may obtain cluster address information for selected files. The cluster address information may include cluster addresses corresponding to one or more clusters changed since a last backup.

The incremental backup service may copy the changed clusters associated with the cluster addresses from a primary storage device to a backup storage device. The incremental backup service may register selected files within a file system as structured files. Files not registered as structured files may be referred to as unstructured files.

The incremental backup service may obtain unstructured file information, including file names and file locations for unstructured files changed since the last backup. The incremental backup service may copy the unstructured files (based on the unstructured file information) from the primary storage device to the backup storage device.

BRIEF DESCRIPTION OF THE DRAWINGS

FIG. 4 is a block diagram illustrating the contents of a change log, according to some embodiments.

Figure 1:
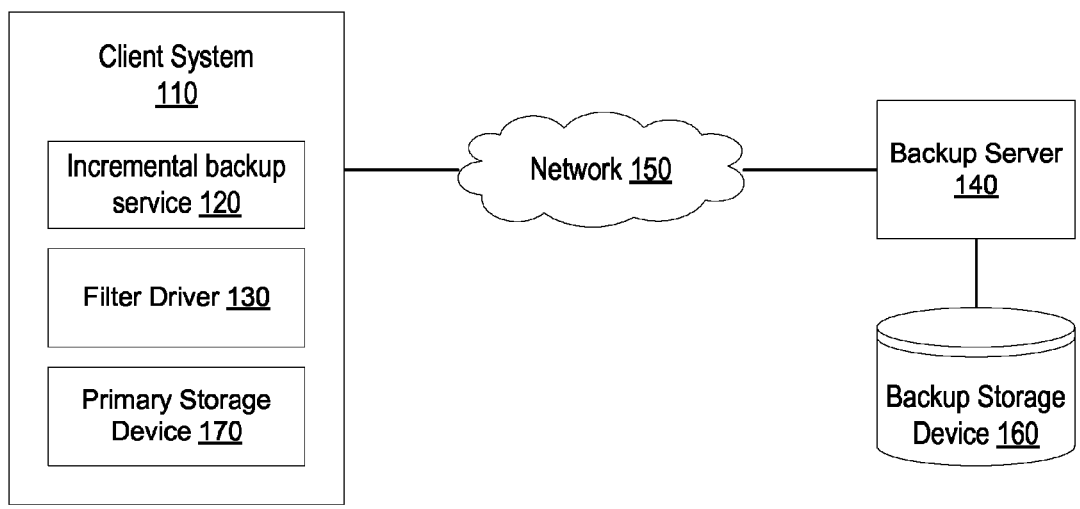
FIG. 1 is a block diagram illustrating a hybrid method for incrementally backing up structured and unstructured files, according to some embodiments.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

Most computing devices have an operating system that accesses a file system. A file system typically provides for reading and writing data to one or more non-volatile storage devices (e.g., hard disk), which may be directly or indirectly connected to a computer system.

Storage devices may fail, resulting in the loss of data. To mitigate storage device failure and loss of data, copies of the data may be made and stored on a backup storage device separate from the primary storage device. Making a "Backup" refers to making a copy of the data so that the copy may be used to "Restore" all or part of the state of the backed up data after a data loss event. In some cases, backup data may be stored on removable media, such as single tape, a tape library including multiple tapes, DVD, CD-ROM and optical disks. In other cases backups may be performed over a network and the copied data may be stored on a storage device connected to a backup server. In still other cases a computer system may be connected to two or more storage devices and a copy of data may be obtained from one storage device and saved to another storage device. The above configurations are given as examples and other configurations have been contemplated.

Backups are typically made periodically (e.g., every night). Backing up data that has not changed since the previous backup is wasteful and time consuming, and in the case where backups are made over a network, backing up unchanged data may unnecessarily take up valuable network bandwidth.

Identifying data changes since the last backup can be complex. Some file systems have an archive bit for each file that specifies whether the file has changed since the last backup. Backup software may analyze the archive bit on each file within the file system and backup the files where archive bit indicates the file has changed since the last backup. In other cases backup software may analyze the date and time the file was last modified and compare it with the last backup date/time to determine whether the file has changed.

A full-plus-incremental backup aims to make storing several copies of the source data more feasible. At first, a full backup (e.g., a copy of all files) is made. Subsequently, an incremental backup is made. With an incremental backup, only the files that changed since the previous full backup or the previous incremental backup are copied. Restoring the whole system requires restoring the full backup and all of the incremental backups in the order in which they were made.

FIG. 1 is a block diagram illustrating a hybrid method for incrementally backing up structured and unstructured files, according to some embodiments. As shown at item 110, a client system may be configured with incremental backup service 120, filter driver 130 and primary storage device 170. Client system 110 may be implemented as any computing device that includes a primary storage device 170. Examples of client system 110 include a personal computer, laptop computer, server, video game unit, or any other computing device configured with a primary storage device 170.

Primary storage device 170 may be implemented as any device that can store data and host a file system. In some embodiments, primary storage device 170 may be implemented as one or more disk drives. In some cases primary storage device 170 may be implemented as a non-volatile memory card (e.g., Secure Digital (SD) flash memory card) or a solid-state drive that emulates a hard disk drive and is configured with a file system. In other cases primary storage device 170 may be implemented as a RAID configuration of disk storage devices, or a network attached storage (NAS) system or a storage area network (SAN) system or another suitable data storage system.

A file system provides a system for storing and organizing computer files and the data they contain. File systems may use a primary storage device 170 such as a hard disk and maintain the physical location or the logical location of files. The file system provides for the storage, hierarchical organization, manipulation, navigation, access and retrieval of data. Examples of file systems include FAT™, FAT32™, NTFS™, HFS™, ext2™ and ext3™. There are many other file systems. File systems typically offer access to an array of fixed size sectors. The file system is used to organize these sectors into files and directories and keep track of which sectors belong to which file, as well as keep track of which sectors are not being used. Most file systems address data in fixed sized units called "Clusters" or "Blocks". File systems may not allocate individual disk sectors 240, but rather may allocate contiguous groups of sectors (e.g., clusters). One cluster may include one or more sectors. For example, a disk with 512 byte sectors may have 4-kilobyte (KB) clusters. In this case, one cluster contains eight sectors. Hereafter, the term "Cluster" will refer to the smallest logical amount of storage space allocated by a file system to hold a file.

The cluster size may be determined primarily by the size of the disk volume. Generally speaking, larger volumes use larger cluster sizes. For hard disks volumes, each cluster typically ranges in size from four sectors (2,048 bytes) to 64 sectors (32,768 bytes). For example, if a volume uses clusters that contain 8,192 bytes, an 8,000-byte file uses one cluster (8,192 bytes on the disk), but an 8,500-byte file uses two clusters (16,384 bytes on the disk). Storing small files on a file system with large clusters may waste disk space; such wasted disk space is called slack space.

File systems may utilize directories and associate filenames with files by connecting the filename to an index into a file allocation table. Directory structures may allow for hierarchies of directories containing files and subdirectories.

A file system may keep metadata associated with each file within the file system. For example, the file system may keep the length of the data contained in the file, the time the file was last modified and the file creation time. Some file systems may keep other attributes or extended attributes associated with each file. In some cases, files may be identified by their characteristics, such as the type of file, the file author or similar metadata. For example, certain file types may be identified by common characteristics in the file name (e.g., filename extension).

Most file systems offer facilities to create, copy, move, rename and delete files and directories. In addition, file systems typically offer facilities to open, close, read, write, truncate and append files.

When an application program writes data to storage, the operating system typically performs the write for the application by interacting with the file system. The application program doesn't need to keep track of clusters or file system metadata and relies on the operating system and the file system to keep track of these details. However, the application program does rely on a specific file format. For example, a word processing application relies on a specific file format for its word processing files. A database application may require a completely different file format.

Primary storage device 170 may store files designated as structured and unstructured files. Structured files may be characterized as large files structured as a series of contiguous records, such that only a few of the records are changed in the period of time between successive backups. When a portion (e.g., record) of a structured file is changed, other surrounding portions within the file are not typically changed. Typically, structured files are not moved on primary storage device 170. For example, database files may be classified as structured files. Unstructured files may be characterized as files without contiguous records. Unstructured files are files in which the contents may be shifted, reorganized or relocated with even the smallest data change. For example, a user may add one character in an unstructured word processing file and the word processing application may shift the entire contents of the word processing file to accommodate the added character. In another example, an image processing application may open a picture file, and a user associated with the image processing application may make a minor change to the image. When the user saves the image, the image processing application may delete the original file in the original location and write the changed file to a different location. In another example, small files may be classified as unstructured files because any change to a small file may result in a large percentage of the file being changed. Further, small files are not typically arranged in a series of contiguous records.

In some embodiments, a user associated with client system 110 may select which files are structured files and which files are unstructured files by registering specific files as structured files. For example, a user associated with client system 110 may utilize an application that allows the user to select and register specific files as structured files. Files not registered may be considered unstructured files. For example, a user may specifically select a database file and/or a registry file as a structured file. In another example, a user may designate structured files by their type, such that files with a certain sequence of characters within their filename (e.g., file name extension) may be designated as structured files. In another example, a user may designate structured files by their file size, such that any file with a file size over a threshold size may be designated as a structured file. The threshold size may be determined by the user or by incremental backup service 120. The file names and locations may be saved and may be accessible by incremental backup service 120 and filter driver 130.

In some embodiments, incremental backup service 120 may be configured to make a complete backup, whereby all of the files on primary storage device 170 are copied to backup storage device 160. Subsequently, incremental backup service 120 may backup only the data changed since the last backup. Incremental backup service 120 may be configured to copy files and/or clusters changed since the last backup from primary storage device 170 and store the files on backup storage device 160. In some embodiments, incremental backup service 120 may include one or more client-side components (e.g., client system 110) and one or more server-side components (e.g., backup server 140) and the components may work together to backup data from primary storage device 170 to backup storage device 160 as shown in FIG. 1.

In another embodiment, backup storage device 160 may be connected directly to network 150 (not shown in FIG. 1) and incremental backup service 120 may run on client system 110, also connected to network 150. Incremental backup service 120 may copy data from primary storage device 170 and store the data on backup storage device 160.

In another embodiment, client system 110 may be connected directly to backup storage device 160. In this case, incremental backup service 120 may copy data from primary storage device 170 and write the data to backup storage device 160.

Incremental backup service 120 may be implemented as an application program, Windows™ Service, daemon or as part of an operating system. Incremental backup service 120 may execute on any suitable operating system, such as Microsoft™ Windows XP™, Vista™, Linux, Unix™, Mac OS™, or any other suitable operating system. In various embodiments, incremental backup service 120 may be implemented as one or more components, executable programs and/or device drivers on client system 110. In a network backup configuration, one or more components of incremental backup service 120 may be implemented on client system 110 and backup server 140, such that components on both systems work together to copy data from primary storage device 170 to backup storage device 160. In a configuration where backup storage device 160 is connected to client system 110, incremental backup service 120 may copy files and/or clusters directly to backup storage device 160.

In various embodiments, incremental backup service 120 may be written in a procedural language such as C or C++, and/or written in assembly language and compiled into one or more executable programs and/or device drivers. One or more components of incremental backup service 120 may be written in an object-oriented language such as Java™ or C#™. Incremental backup service 120 may be compiled into byte code and execute within a runtime environment, such as a Java Virtual Machine™ or within a framework, such as the .Net™ framework. In some embodiments, one or more components of incremental backup service 120 may be implemented within a web browser and utilize HTML, Javascript™, plug-ins, plug-in components, XML, SOAP or another suitable technology.

Filter driver 130 may reside on client system 110 and intercept, or monitor data writes that client system 110 may make to primary storage device 170. In various embodiments, filter driver 130 may be implemented as a device driver, Windows™ service, daemon, stand-alone application, or as part of an operating system. Filter driver 130 may be integrated as part of incremental backup service 120, or filter driver 130 may be implemented as a separate entity. In various embodiments, filter driver 130 may run in kernel-mode or user-mode. Filter driver 130 may be written in a procedural language, such as C or C++ or filter driver 130 may be written in assembly language. In other embodiments, filter driver 130 may be written in an object-oriented language, such as Java™ or C#™. Filter driver 130 may be compiled into byte code and run within a runtime environment such as a Java Virtual Machine™ or within a framework, such as the .NET™ framework.

When client system 110 writes data to primary storage device 170, filter driver 130 may determine which file is being written to (e.g., file name and location). Filter driver 130 may determine which clusters within the file are changed. In some embodiments, filter driver 130 may determine the changed clusters for all files changed since the last backup. In other embodiments, filter driver 130 may determine the changed clusters for only selected files. The selected files may include files registered as structured files. Clusters may be tracked by a cluster address, assigned by the file system. Filter driver 130 may be configured to store information about each write in a change log. The change log may include information about all clusters changed since the last backup. For each data write to primary storage device 170, filter driver 130 may store in the change log, information that may include the file name, file location, the date and time the file was changed and a list of cluster addresses for clusters changed within the file. In various embodiments, additional information or less information may be stored in the change log. (See the description for FIG. 4 for more information about the change log.)

In some embodiments, filter driver 130 may determine which files within the file system are structured files and which files are unstructured files and filter driver 130 may be configured to register files as structured files depending on the how changes are made to the files. For example, filter driver 130 may determine whether or not changed portions of a file impact surrounding portions within the file that are not changed. Filter driver 130 may monitor one or more changes to a file over time to determine if the file has contiguous records, such that when one record is changed, other records are not changed. In one example, if a record within a database file is changed, filter driver 130 may determine that other records surrounding the changed record are not changed and register the database file as a structured file. Thereafter, when the file is backed up, only the changed clusters may be copied and not the entire file.

In various embodiments, network 150 may be configured to allow data to be exchanged between client system 110 and backup server 140. Network 150 may correspond to various methods of communication between entities. In general, network 150 may represent any method that one entity may utilize to communicate with another entity. While network 150 may be illustrated in a generalized manner, one of ordinary skill in the art will recognize that network 150 is meant to be representative of a complete communication path between the entities depicted in FIG. 1 with a specific type of communication channel. For example, network 150 may represent one or more communications channels and may include one or more telecommunications networks as well as various data networks. Network 150 may include network devices such as circuits, switches, routers, hubs and/or gateways. Network 150 may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol. Data may be transmitted on network 150 using transmission control protocol (TCP) and the Internet protocol (IP) or another suitable network transport protocol. In various embodiments, the services described herein may utilize any suitable compression and/or cryptographic protocol when communicating over network 150.

Backup server 140 may be any server configured to connect to network 150; backup data located on client 110 and store the data on backup storage device 160. In various embodiments network 150 may be implemented as a local area network (LAN) or a wide area network (WAN) and backup server 140 may backup data from client 110 via network 150 as shown in FIG. 1A. In some embodiments, backup server 140 may be located in a remote location and may backup data from client system 110 via the Internet (e.g., network 150). In some cases backup server 140 may be configured to backup data from a plurality of client system 110s. Backup server 140 may host one or more components of incremental backup service 120, including web server applications, web services, an application server or another suitable component used to assist with backing up data.

Backup storage device 160 may be any storage device configured to store backup data. Storage device 160 may be implemented as a magnetic tape device, tape library, optical disk storage device, DVD writer or CD-ROM writer. Backup storage device 160 may be implemented as one or more disk storage devices, such as a RAID configuration, a network attached storage (NAS) configuration, a storage area network (SAN) configuration, or any other device configured to store data.

In some embodiments, backup storage device 160 may be connected to directly to network 150, (not shown in FIG. 1) and incremental backup service 120 may backup and restore data to backup storage device 160 via network 150. In other embodiments, backup storage device 160 may be connected directly to client system 110 (not shown in FIG. 1). In this case incremental backup service 120 may be configured to backup and restore data directly to backup storage device 160.

In one example of how the method and system described herein may work, a user associated with client system 110 may utilize an application to register one or more files as structured files. Thereafter, incremental backup service 120 may make a complete backup, such that all of the files on primary storage device 170 are copied to backup storage device 160. After the complete backup, various applications may execute on client system 110 and change data on primary storage device 170. Filter driver 130 may intercept the write requests and determine if the write requests are to files registered as structured files. If a write request is to a structured file, filter driver 130 may determine the address(es) of the clusters changed by the write operation and write the cluster address information to a change log, along with the file name and location and the date and time the write operation occurred. (In various embodiments, more or less data may be included in the log for each write operation.)

At a predetermined time (e.g., a scheduled daily backup) incremental backup service 120 may perform an incremental backup. Incremental backup service 120 may read the change log to determine the clusters changed in structured files since the last backup. Incremental backup service 120 may then copy the changed clusters from primary storage device 170 and write the changed clusters to backup storage device 160. Note that incremental backup service 120 does not need to read the entire file and retrieve previously generated backup copies of the selected files from backup storage device 160 to determine the changes. The changed cluster information may be obtained from the change log. Subsequently, incremental backup service 120 may determine the small files changed since the last backup. Small files may be determined by comparing the file size of each file on primary storage device 170 to a threshold size. If the file is smaller than the threshold size and has changed since the last backup, incremental backup service 120 may copy the entire file from primary storage device 170 to backup storage device 160. Incremental backup service 120 may also analyze the large unstructured files. Large unstructured files are unstructured files with a size larger than the threshold size. Incremental backup service 120 may read each of the large files and compare them to a corresponding file, previously backed up and located on backup storage device 160. This requires incremental backup service 120 to open and read both files to determine the differences. If the differences (i.e., ratio of changed clusters) are less than a threshold ratio amount (e.g., three-fourths of the file) incremental backup service 120 may copy the clusters associated with the changes in the file from primary storage device 170 and write the changed clusters to backup storage device 160. If the differences (i.e., ratio of changed clusters) represent a ratio over the threshold ratio, incremental backup service 120 may copy the entire file from primary storage device 170 to backup storage device 160. The threshold ratio may be designated by a user or system administrator of a incremental backup service administration application, or, in other embodiments, the threshold ratio may be determined by incremental backup service 120.

Figure 2:
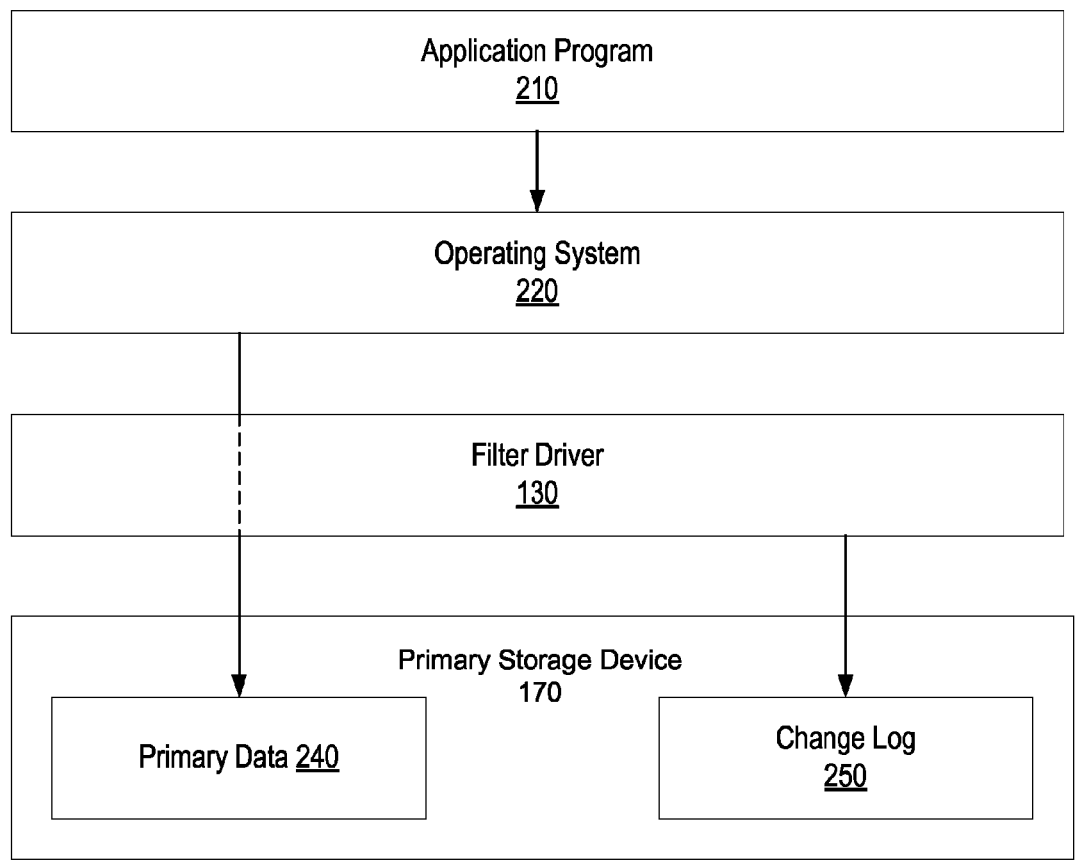
FIG. 2 is a block diagram illustrating a filter driver 130 intercepting a write operation, according to some embodiments.

FIG. 2 is a block diagram illustrating filter driver 130 intercepting a write operation, according to some embodiments. Application 210 may perform a write operation to primary data 240 on client system 110. Application 210 may be any application that writes data to storage. Examples include a word processing application, email application and database application. Application 210 may interact with operating system 220 to perform the file operations, such as open, read, write and close. Operating system 220 may interact with a file system to perform these operations. Filter driver 130 may monitor the operations performed between operating system 220 and the file system. Filter driver 130 may determine the clusters changed when the file operation is performed. Filter driver 130 may record information about the file operation to change log 250. Filter driver 130 may record information about deleted data, changed data and added data and store the data in change log 250. Filter driver 130 may record the cluster addresses of the changed clusters, the date and time of the modification and the file name and file location. In various embodiments, more or less data may be recorded.

In some embodiments, change log 250 may include information about changed portions (e.g., records) within a file, and change log 250 may be maintained by an application other than a filter driver 130 or incremental backup service 120. For example, change log 250 may be maintained by a database application and the database application may log information about changes to a database file. Incremental backup service 120 may read the change information maintained by the database application and determine which clusters have changed within the file. The database application is given as one example, and many other applications may maintain change information about files to which they read and write.

Figure 3:
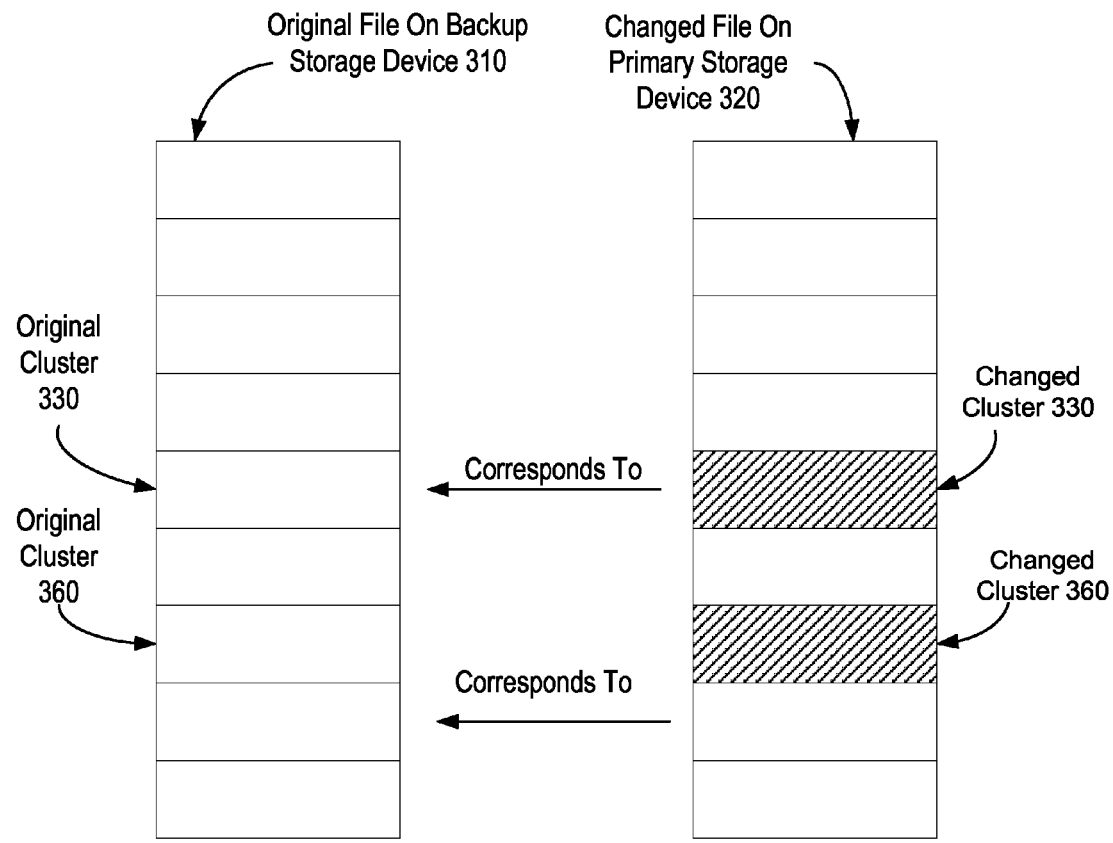
FIG. 3 is a block diagram illustrating the clusters in an original file and a changed file, according to some embodiments.

FIG. 3 is a block diagram illustrating the clusters in an original structured file (Item 310) and a changed structured file (Item 320), according to some embodiments. As shown at item 310, a storage device 160 may contain an original structured file. The original structured file may have been backed up to storage device 160. Item 320 may represent the structured file on client system 110. Subsequent to a backup operation, the structured file shown at block 320 may be changed by application 210. When the structured file is changed, specific clusters may be changed without changing surrounding clusters. For example, cluster 330 and cluster 360 may be changed. Each of these clusters may correspond to the respective clusters in the original file on backup storage device 310. When incremental backup service 120 executes, it may determine changed file 320 is a structured file; read change log 250 to determine the addresses of changed clusters 330 and 360, and then copy the clusters from primary storage device 170 to storage device 160. As shown in FIG. 3, changed clusters may reside at one or more locations with the file.

FIG. 4 is a block diagram illustrating the contents of a change log, according to some embodiments. As described above, change log 250 may be a log of changes performed to structured files since the last backup. Filter driver 130 may add contents to change log when changes occur to structured files. In various embodiments, change log 250 may be implemented as an XML file, one or more records within a relational database or another suitable file type. Change log 250 may be located on client system 110, backup storage server 140 or on another suitable location accessible by filter driver 130. Change log 250 may include the file name and location (Item 410) of the structured file changed since the last backup, as well as the cluster address (Item 415) and the date and time the cluster was changed (item 420). Note that in many cases a write request may include two or more cluster changes. In this case, all of the clusters changed may be recorded in change log 250. In some cases a record of changes may include every cluster address changed. In other cases a record of changes may include one or more ranges of cluster addresses (e.g., cluster addresses 100-110). In various embodiments, fewer or more data elements may be saved in change log 250 for each write request.

Figure 5:
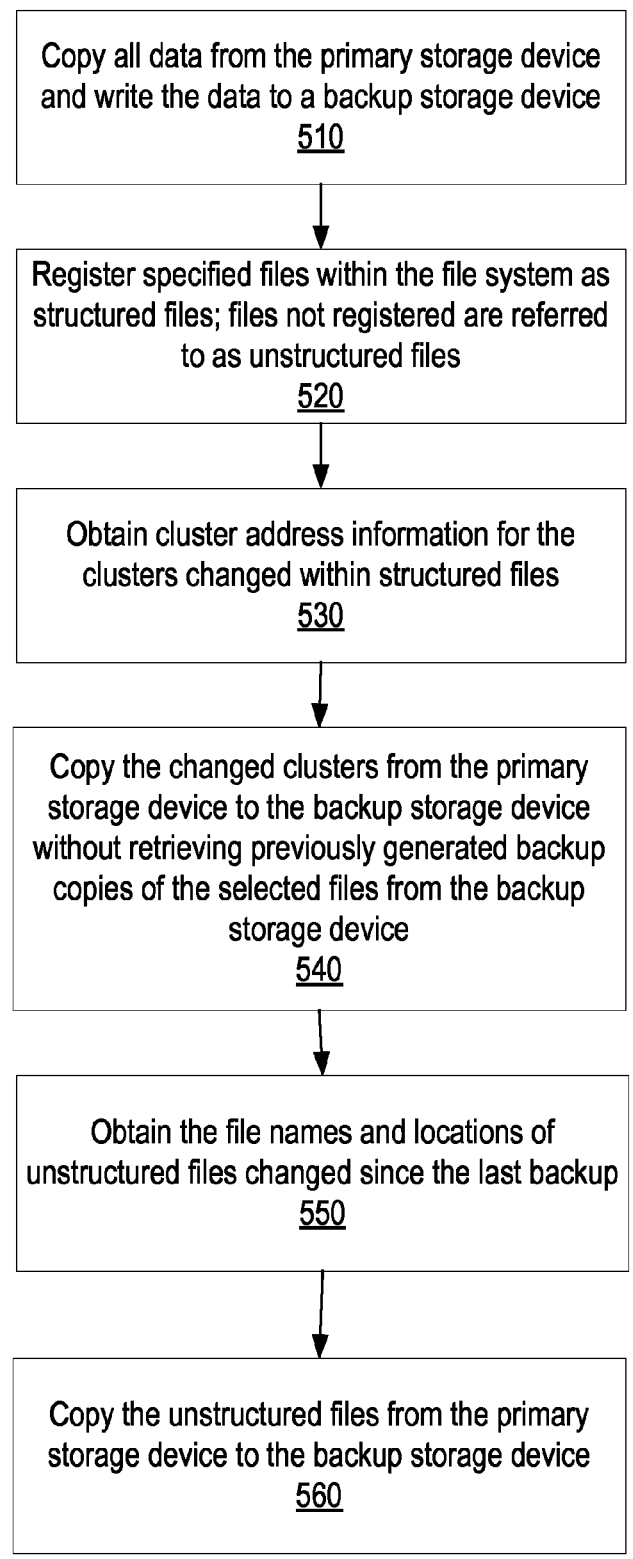
FIG. 5 is a flow diagram illustrating a method of incrementally backing up structured and unstructured files, according to some embodiments.

FIG. 5 is a flow diagram illustrating a method of incrementally backing up structured and unstructured files, according to some embodiments. As shown at block 510, incremental backup service 120 may copy all data from the primary storage device 170 and write the data to a backup storage device 160. This is the initial backup. Subsequently, incremental backup service 120 may copy data changed since the previous backup.

As shown at block 520, a user associated with client system 110 may register specified files within the file system as structured files. The user may utilize an application program that allows the user to select files within the file system on client system 110. The file selections may be stored on client system 110 or another location accessible by incremental backup service 120 and filter driver 130. Files not registered may be referred to as unstructured files.

During the time period between backups, various applications and/or the operating system may change files. Periodically, (e.g., every day) incremental backup service 120 may perform an incremental backup. As shown at block 530, incremental backup service 120 may obtain cluster address information for the clusters changed within the structured files since the previous backup. Incremental backup service 120 may obtain the addresses of the changed clusters since the last backup from change log 250. Incremental backup service 120 may copy the changed clusters of the structured files from the primary storage device 170 to the backup storage device 160 without retrieving previously generated backup copies of the selected files from the backup storage device, as shown at block 540. As shown in block 550, incremental backup service 120 may obtain the file names and file locations of unstructured files changed since the last backup. Incremental backup service 120 may determine which files have changed by comparing the last modify date/time of the file on client system 110 to the last modify date/time of the corresponding file on backup storage device 160. A newer date/time on the file on client system 110 indicates the file has changed. Other methods may be used to determine the file has changed, such as checking an archive bit. As shown in block 560, the unstructured files may be copied from primary storage device 170 to backup storage device 160.

Figure 6:
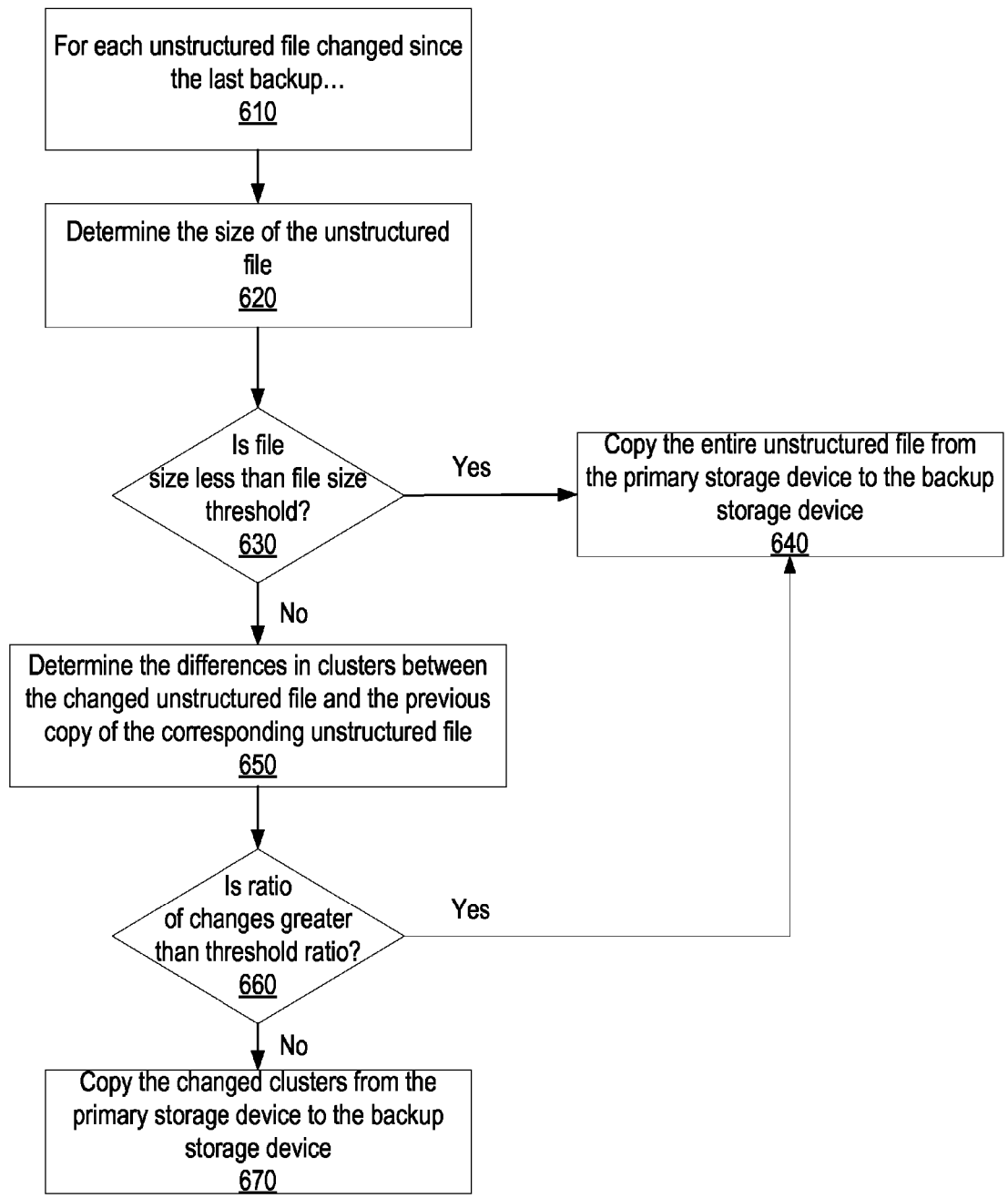
FIG. 6 is a flow diagram illustration the backing up of unstructured files, according to some embodiments.

In some embodiments, instead of copying the entirety of all unstructured files from primary storage device 170 to backup storage device 160 as shown in block 560, of FIG. 5, incremental backup service 170 may perform the operations shown in FIG. 6.

FIG. 6 is a flow diagram illustration the backing up of unstructured files, according to some embodiments. As shown in block 610, for each unstructured file changed since the last backup, incremental backup service 120 may determine the file size of the unstructured file, as shown in block 620. Incremental backup service 120 may then determine if the file size is less than a file size threshold, as shown in block 630. In some cases, a system administrator or user of client system 110 may determine the file size threshold. In other cases, incremental backup service 120 may be configured to determine the file size threshold. If the unstructured file size is less than the file size threshold, incremental backup service 120 may copy the entire unstructured file from the primary storage device to the backup storage device, as shown in block 640.

For those unstructured files greater in size than the file size threshold, incremental backup service 120 may determine the differences in clusters between the changed unstructured file and the previous copy or copies of the corresponding unstructured file, as shown in block 650. In some embodiments, incremental backup service 120 may stream, or read all copies of the file (e.g., old and new) to determine the differences. Various algorithms may be used to determine the file differences. Incremental backup service 120 may determine the ratio of changes to the unstructured file, as shown in block 660. If the ratio of changes to the unstructured file is greater than a threshold ratio, incremental backup service 120 may copy the entire file from primary storage device 170 to backup storage device 160, as shown in block 640. If the ratio of changes to the unstructured file is less than the threshold ratio, incremental backup service 120 may determine the changed clusters in the file and copy only the changed clusters from primary storage device 170 to backup storage device 160, as shown in block 670. A user or system administrator of client system 110 may determine the threshold ratio.

Figure 7:
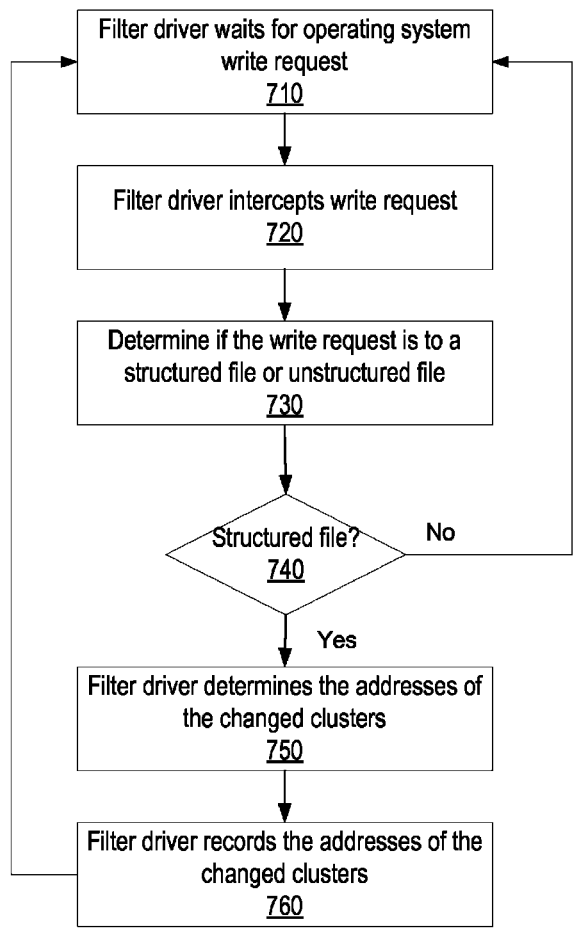
FIG. 7 is a flow diagram illustrating a filter driver 130, according to some embodiments.

FIG. 7 is a block diagram illustrating a filter driver 130, according to some embodiments. As shown in block 710, filter driver 130 may monitor write operations to a file system on primary storage device 170. As described above, filter driver 130 may be implemented as a device driver or as part of operating system 220. When a write operation is detected, filter driver 130 may intercept or monitor the write operation, as shown in block 720. Filter driver 130 may then determine if the write operation is to a structured file, as shown in block 730 and block 740. If the write operation is to a structured file, filter driver 130 may determine the address(es) of the changed clusters, as shown in block 750. Filter driver 130 may determine the cluster addresses by interacting with the file system and/or operating system 220. Filter driver 130 may record the addresses of the changed clusters in change log 250.

Figure 8:
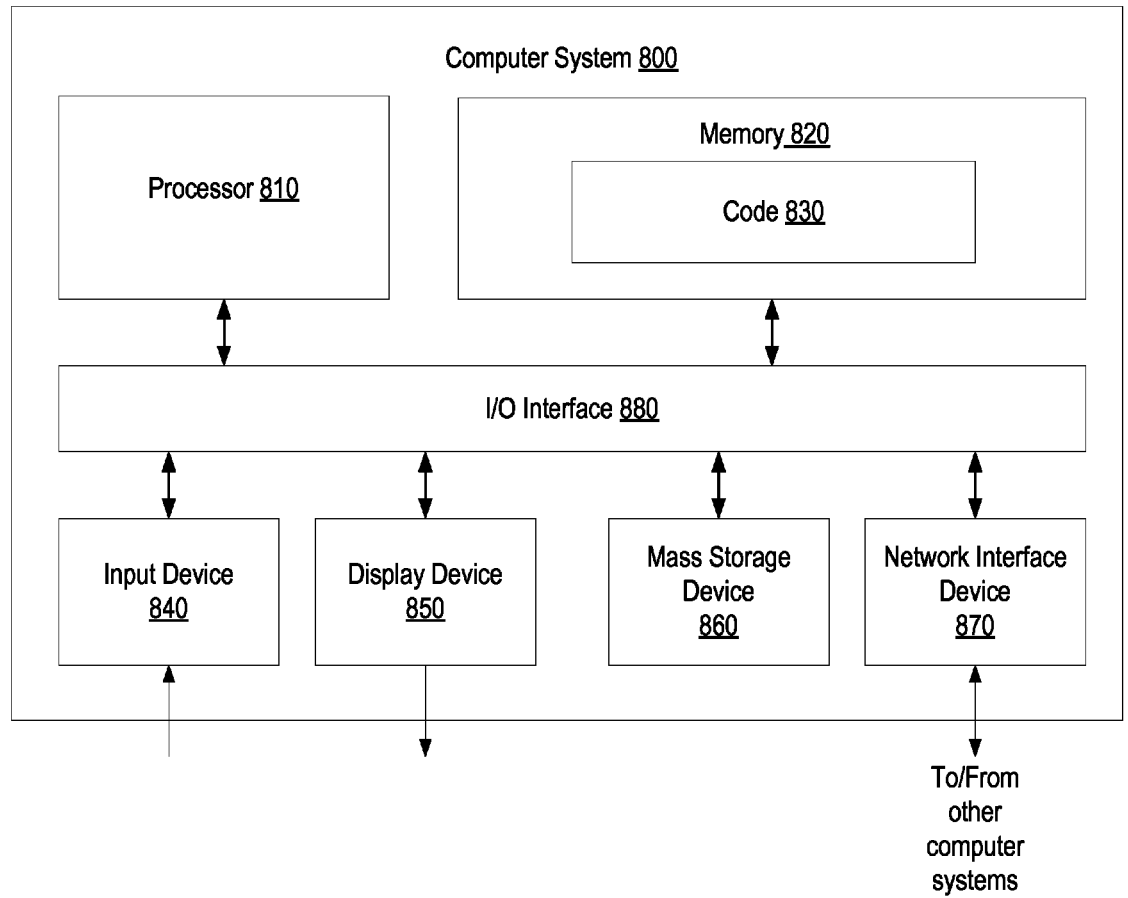
FIG. 8 is a block diagram illustrating a system for implementing a hybrid method and system of storing structured and unstructured files, according to some embodiments.

FIG. 8 is a block diagram illustrating a computing device, according to an embodiment. Various components of embodiments of the client systems, backup servers, storage devices, clients and nodes, etc., as described herein, may be executed on one or more computer systems, which may interact with various other devices. One such computer system is illustrated by FIG. 8. In the illustrated embodiment, computer system 800 includes one or more processors 810 coupled to a system memory 820. Computer system 800 further includes a network interface 870 and one or more input/output devices 840/850, such as a cursor control device, keyboard, audio device and display device 850. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC™, Scalable Processor Architecture (SPARC™), or Million Instructions per Second (MIPS™) Instruction Set Architectures (ISAs), or any other suitable ISA. In multiprocessor systems, each of processors 810 may commonly, but not necessarily, implement the same ISA.

System memory 820 is one example of a computer accessible medium that may be configured to store program instructions 830 and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for incremental backup service 120 and filter driver 130, as well as any of the methods shown in FIGS. 1-7, are shown stored within system memory 820 as program instructions 830 and data storage 860, respectively. In other embodiments, program instructions and/or data may be stored upon different types of computer-accessible media or on similar media separate from system memory 820 or computer system 800. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM). Program instructions and data stored via a computer-accessible medium may be transmitted by transmission media or signals such as electrical, electromagnetic, or digital signals, which may be provided via a communication medium such as a network and/or a wireless link, such as may be implemented via network interface 870.

In one embodiment, I/O interface 880 may be configured to coordinate I/O traffic between processor 810, system memory 820, and any peripheral devices in the device, including network interface 870 or other peripheral interfaces. In some embodiments, I/O interface 880 may perform any necessary protocol, timing or other data transformations to convert data signals from one component (e.g., system memory 820) into a format suitable for use by another component (e.g., processor 810). In some embodiments, I/O interface 880 may include support for devices attached through various types of peripheral buses, such as a variant of Peripheral Component Interconnect (PCI) bus standard or the Universal Serial Bus (USB) standard, for example. In some embodiments, the function of I/O interface 880 may be split into two or more separate components, such as a north bridge and a south bridge, for example. Also, in some embodiments some or all of the functionality of I/O interface 880, such as an interface to system memory 820, may be incorporated directly into processor 810.

Network interface 870 may be configured to allow data to be exchanged between computer system 800 and other devices attached to a network, such as other computer systems, or between nodes of computer system 800. In various embodiments, network interface 870 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 840 and 850 respectively, may in some embodiments include one or more display terminals, keyboards, keypads, touchpads, scanning devices, voice or optical recognition devices, or any other devices suitable for entering or retrieving data by one or more computer system 800. Multiple input/output devices 840 and 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 870.

Memory 820 may include program instructions 830, configured to implement at least a portion of embodiments of the incremental backup service 120 and filter driver 130 as described herein, and data storage 860, comprising various documents, tables, databases, etc. accessible by program instructions 830. In one embodiment, program instructions 830 may include software elements of the incremental backup service 120 and filter driver 130 illustrated in the figures, and data storage 860 may include data used in embodiments of the incremental backup service 120 and filter driver 130. In other embodiments, different software elements and data may be included. Program instructions and/or data may be stored, for example, on various types of memory including hard disks.

Those skilled in the art will appreciate that computer system 800 is merely illustrative and is not intended to limit the scope of the system as described herein. In particular, the computer system and devices may include any combination of hardware or software that can perform the indicated functions, including computers, network devices, internet appliances, PDAs, mobile phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, provided via a communication medium such as a network and/or a wireless link. Various embodiments may further include receiving, sending or storing instructions and/or data implemented in accordance with the foregoing description. Accordingly, the present system may be practiced with other computer system configurations.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc. Additionally, it is intended that any inconsistency in description between this document and any document incorporated within this document be resolved in favor of this document.

Various modifications and changes may be made as would be obvious to a person skilled in the art having the benefit of this disclosure. It is intended that the system embrace all such modifications and changes and, accordingly, the above description to be regarded in an illustrative rather than a restrictive sense.

What is claimed is:

1. A computer-implemented method, comprising:
   obtaining cluster address information for a file selected from a plurality of files stored in a file system,
     wherein the cluster address information is specific to the selected file,
     wherein the cluster address information corresponds to one or more clusters changed in the selected file since a last backup of the selected file,
     wherein the selected file corresponds to a plurality of clusters which comprise the one or more clusters changed in the selected file, and
     wherein the one or more clusters changed in the selected file are less than all of the plurality of clusters for the selected file; and
   subsequent to obtaining the cluster address information, incrementally backing up the selected file of the plurality of files;
   wherein said incrementally backing up the selected file comprises copying the one or more clusters changed in the selected file from a primary storage device to a backup storage device without retrieving previously generated backup copies of the selected file from the backup storage device.

2. The computer-implemented method of claim 1, further comprising registering the selected file of the plurality of files within a file system as a structured file, wherein files not selected as structured files within the file system comprise unstructured files.

3. The computer-implemented method of claim 2, further comprising:
   obtaining unstructured file information, wherein said unstructured file information comprises a plurality of file names and file locations for one or more particular ones of the plurality of unstructured files changed since a last backup of the unstructured files; and
   backing up the one or more particular ones of the unstructured files, wherein backing up the one or more particular ones of the unstructured files comprises copying the one or more particular ones of the unstructured files from the primary storage device to the backup storage device according to the unstructured file information.

4. The computer-implemented method of claim 2, wherein said registering comprises receiving file selection information from a user and storing the file selection information.

5. The computer-implemented method of claim 2, further comprising:
   a filter driver monitoring file system write operations to structured files located on the file system;
   the filter driver determining the addresses of the changed clusters of the structured files associated with the write operations; and
   the filter driver recording the changed clusters of the structured files to a change log.

6. The computer-implemented method of claim 2, further comprising:
   for each given unstructured file of the unstructured files changed since the last backup:
     determining a file size of the given unstructured file;
     if the file size is less than a threshold size, copying the given unstructured file from the primary storage device to the backup storage device;
     if the file size is greater than the threshold size:
       determining differences between the given unstructured file on the primary storage device and a copy of a given corresponding unstructured file on the backup storage device;
       determining changed clusters associated with said differences between the given unstructured file on the primary storage device and the copy of the given corresponding unstructured file on the backup storage device; and
       copying the changed clusters from the primary storage device to the backup storage device.

7. The computer-implemented method of claim 6, further comprising receiving input from a user, wherein said user input comprises the threshold size.

8. The computer-implemented method of claim 6, further comprising:
   for each given unstructured file changed since the last backup:
     in response to determining the given unstructured file size is greater than the threshold size, determining a ratio of changed clusters to unchanged clusters within the given unstructured file;
     comparing said ratio of changed clusters to unchanged clusters within the given unstructured file to a threshold ratio;
     in response to determining the ratio of the changed clusters to the unchanged clusters is greater than the threshold ratio, copying the entire file from the primary storage device to the backup storage device.

9. The computer-implemented method of claim 8, further comprising receiving input from a user, wherein said user input comprises the threshold ratio.

10. A system, comprising:
    one or more processors;
    a memory coupled to one or more processors, wherein the memory stores program instructions executable by the one or more processors to implement an incremental backup service configured to:
obtain cluster address information for a file selected from a plurality of files stored in a file system,
wherein the cluster address information is specific to the selected file,
wherein the cluster address information corresponds to one or more clusters changed in the selected file since a last backup of the selected file,
wherein the selected file corresponds to a plurality of clusters which comprise the one or more clusters changed in the selected file, and
wherein the one or more clusters changed in the selected file are less than all of the plurality of clusters for the selected file; and
subsequent to obtaining the cluster address information, incrementally back up the selected file of the plurality of files;
wherein to incrementally back up of the selected file the incremental backup service is further configured to copy the one or more clusters changed in the selected file from a primary storage device to a backup storage device without retrieving previously generated backup copies of the selected file from the backup storage device.

11. The system as recited in claim 10, wherein the incremental backup service is further configured to register the selected file of the plurality of files within a file system as a structured file, wherein files not selected as structured files within the file system comprise unstructured files.

12. The system as recited in claim 10, wherein the incremental backup service is further configured to:
obtain unstructured file information, wherein said unstructured file information comprises a plurality of file names and file locations for one or more particular ones of the plurality of unstructured files changed since a last backup of the unstructured files; and
backup the one or more particular ones of the unstructured files, wherein backing up the one or more particular ones of the unstructured files comprises copying the one or more particular ones of the unstructured files from the primary storage device to the backup storage device according to the unstructured file information.

13. The system as recited in claim 11, wherein to register the selected file of the plurality of files, the incremental backup service is further configured to receive file selection information from a user and storing the file selection information.

14. The system as recited in claim 11, wherein said program instructions are further executable by the one or more processors to implement a filter driver, wherein said filter driver is configured to:
monitor file system write operations to structured files located on the file system;
determine the addresses of the changed clusters of the structured files associated with the write operations; and
record the changed clusters of the structured files to a change log.

15. The system as recited in claim 11, wherein the incremental backup service is further configured to:
for each given unstructured file of the unstructured files changed since the last backup:
determine a file size of the given unstructured file;
in response to determining the given unstructured file size is less than a threshold size, copy the given unstructured file from the primary storage device to the backup storage device;
in response to determining the given unstructured file size is greater than the threshold size:
determine differences between the given unstructured file on the primary storage device, and a copy of a given corresponding unstructured file on the backup storage device;
determine changed clusters associated with said differences between the given unstructured file on the primary storage device and the copy of the given corresponding unstructured file on the backup storage device; and
copy the changed clusters from the primary storage device to the backup storage device.

16. The system as recited in claim 15, further, wherein the incremental backup service is further configured to receive input from a user, wherein said user input comprises the threshold size.

17. The system as recited in claim 15, wherein the incremental backup service is further configured to:
for each given unstructured file changed since the last backup:
in response to determining the given unstructured file size is greater than the threshold size, determine a ratio of changed clusters to unchanged clusters within the given unstructured file;
compare said ratio of changed clusters to unchanged clusters within the given unstructured file to a threshold ratio;
in response to determining the ratio of the changed clusters to the unchanged clusters is greater than the threshold ratio, copy the entire file from the primary storage device to the backup storage device.

18. The system as recited in claim 17, wherein the incremental backup service is further configured to receive input from a user, wherein said input from the user comprises the threshold ratio.

19. A computer-accessible storage medium storing program instructions computer-executable to implement an incremental backup service configured to:
obtain cluster address information for a file selected from a plurality of files stored in a file system,
wherein the cluster address information is specific to the selected file,
wherein the cluster address information corresponds to one or more clusters changed in the selected file since a last backup of the selected file,
wherein the selected file corresponds to a plurality of clusters which comprise the one or more clusters changed in the selected file, and
wherein the one or more clusters changed in the selected file are less than all of the plurality of clusters for the selected file; and
subsequent to obtaining the cluster address information, incrementally back up the selected file of the plurality of files;
wherein said incrementally back up of the selected file comprises copying the one or more clusters changed in the selected file from a primary storage device to a backup storage device without retrieving previously generated backup copies of the selected file from the backup storage device.

20. The computer-accessible storage medium as recited in claim 19, wherein said incremental backup service is further configured to register the selected file of the plurality of files within a file system as a structured file, wherein files not selected as structured files within the file system comprise unstructured files.

* * * * *